March 29, 1938. W. UTZ Re. 20,682

OCCUPANT PROPELLED VEHICLE

Original Filed Nov. 6, 1934 4 Sheets-Sheet 1

Inventor

William Utz

By Clarence A. O'Brien

Attorney

March 29, 1938. W. UTZ Re. 20,682

OCCUPANT PROPELLED VEHICLE

Original Filed Nov. 6, 1934 4 Sheets-Sheet 2

Inventor

William Utz

By Clarence A. O'Brien

Attorney

March 29, 1938. W. UTZ Re. 20,682
OCCUPANT PROPELLED VEHICLE
Original Filed Nov. 6, 1934 4 Sheets-Sheet 3
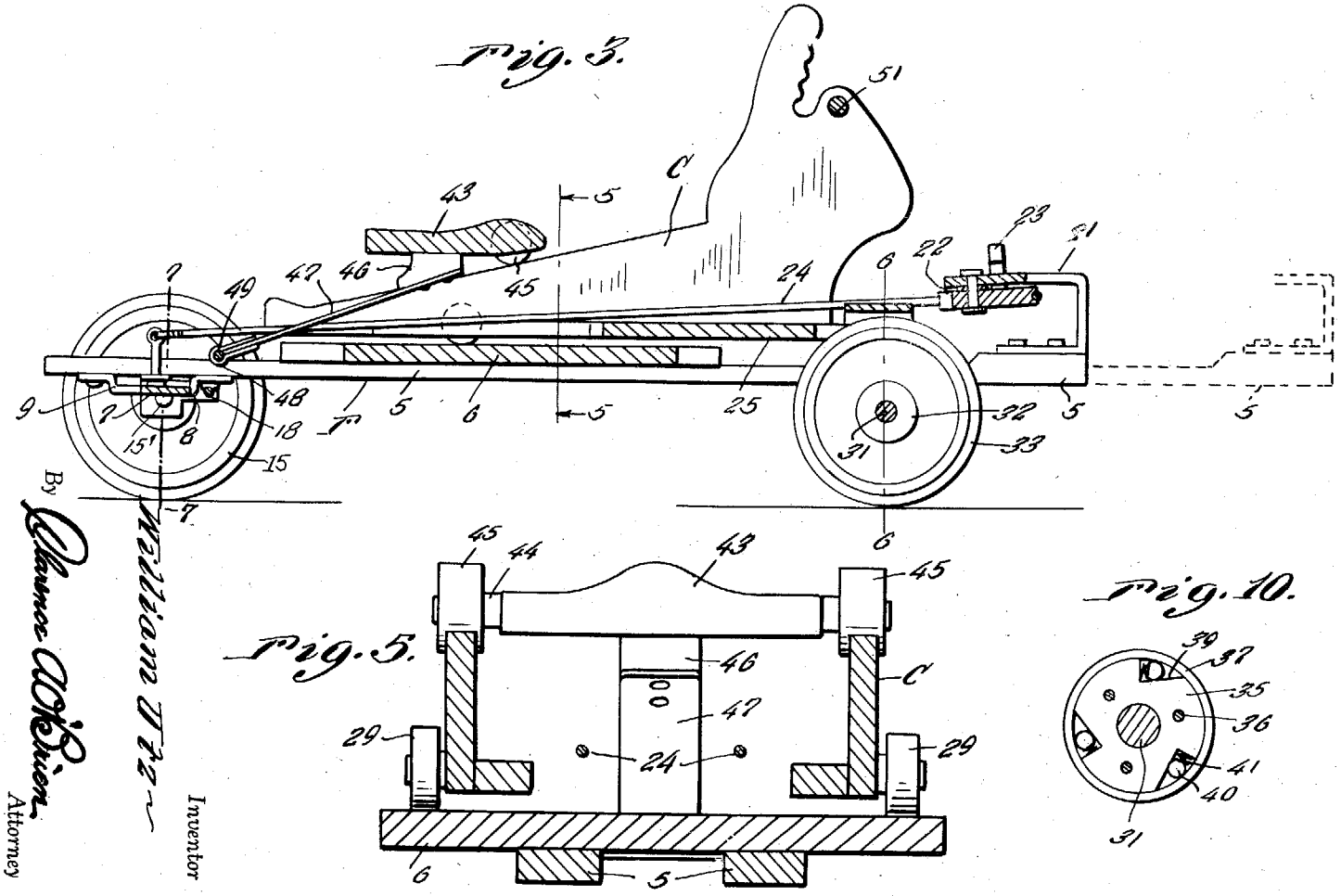
Inventor
William Utz
By Clarence A. O'Brien
Attorney March 29, 1938. W. UTZ Re. 20,682
OCCUPANT PROPELLED VEHICLE
Original Filed Nov. 6, 1934 4 Sheets-Sheet 4
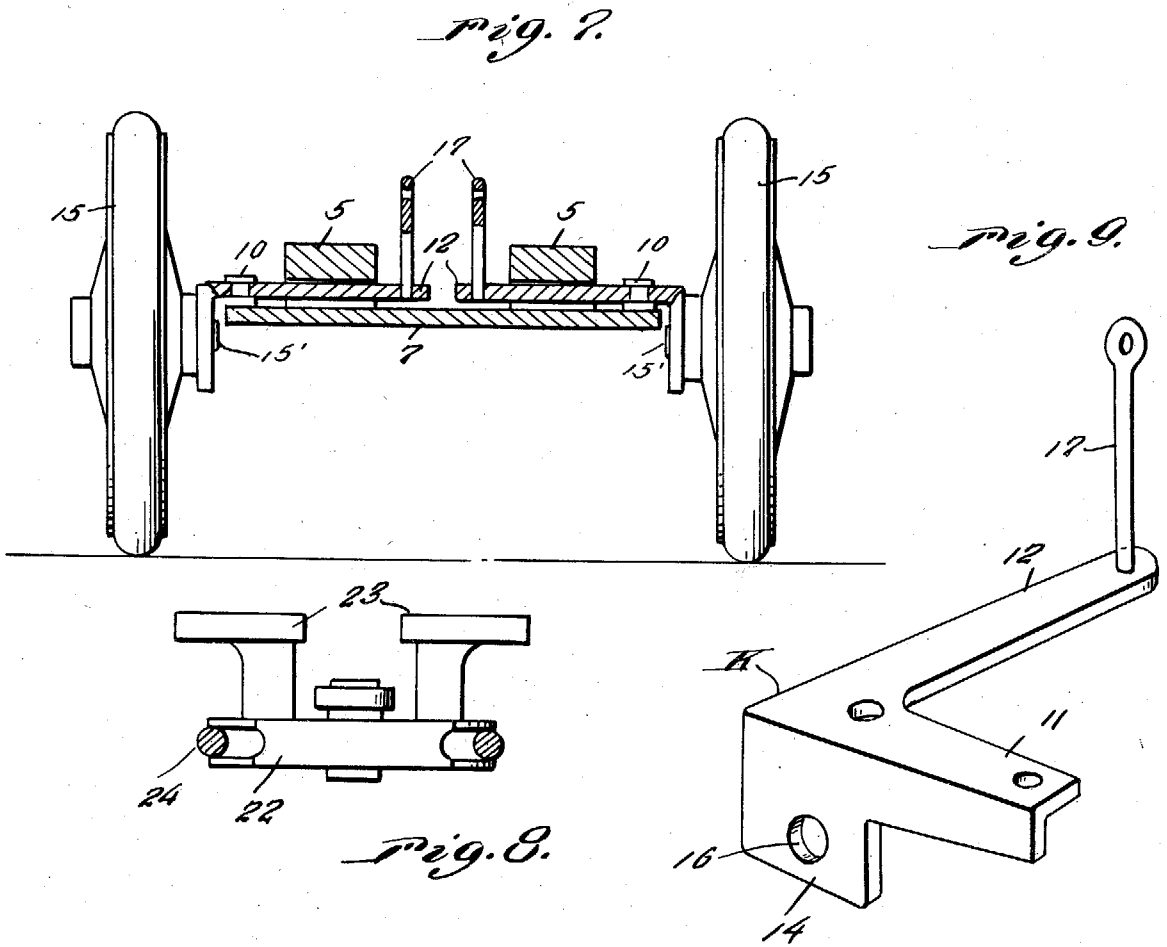
Inventor
William Utz
By Clarence A. O'Brien
Attorney Reissued Mar. 29, 1938

Re. 20,682

UNITED STATES PATENT OFFICE 20,682

OCCUPANT PROPELLED VEHICLE

William Utz, Detroit, Mich.

Original No. 2,019,833, dated November 5, 1935, Serial No. 751,772, November 6, 1934. Application for reissue September 4, 1936, Serial No. 99,386

9 Claims. (Cl. 280—210)

The present invention relates to an occupant propelled vehicle and has for its prime object to provide a vehicle of this type having two sections reciprocably and slidably connected together in such a manner that they may be moved with respect to each other and set up motive power for the vehicle.

A further important object of the invention resides in the provision of a vehicle of this nature which is provided with a novel steering mechanism.

A still further important object of the invention resides in the provision of a vehicle of this nature which is simple in its construction, strong and durable, easy to manipulate, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Fig. 3 is a vertical longitudinal section taken substantially on the line 3—3 of Figure 1.

Fig. 5 is a vertical transverse section taken substantially on the line 5—5 of Figure 3.

Fig. 7 is a vertical transverse section taken on the line 7—7 of Figure 3.

Fig. 8 is a detail vertical transverse section taken substantially on the line 8—8 of Figure 2 looking forwardly.

Fig. 9 is a perspective view of one of the steering knuckles, and

Fig. 10 is an enlarged detail sectional view taken substantially on the line 10—10 of Figure 6.

Figure 1:
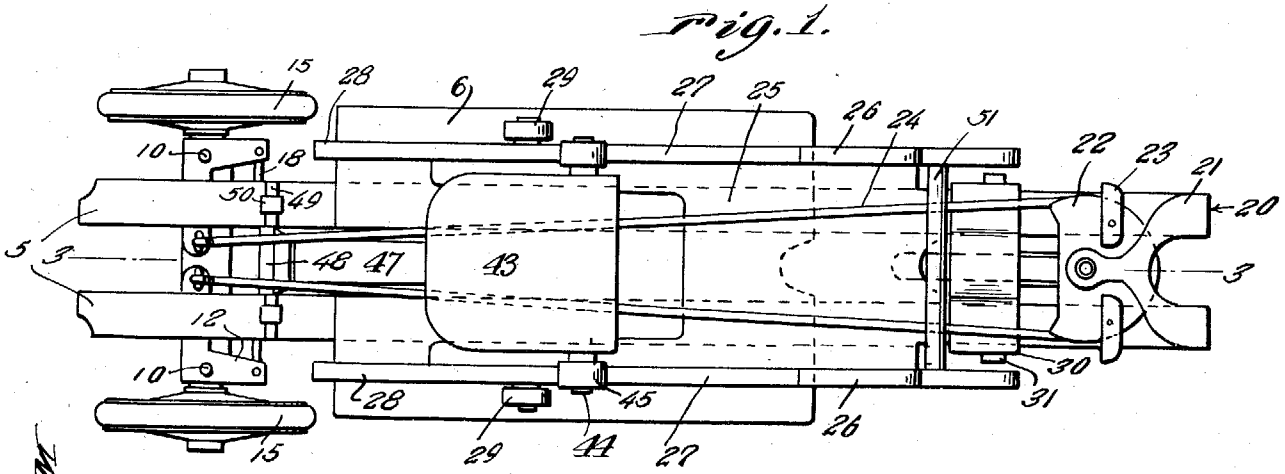
Fig. 1 is a top plan view of a vehicle embodying the features of my invention.
Figure 4:
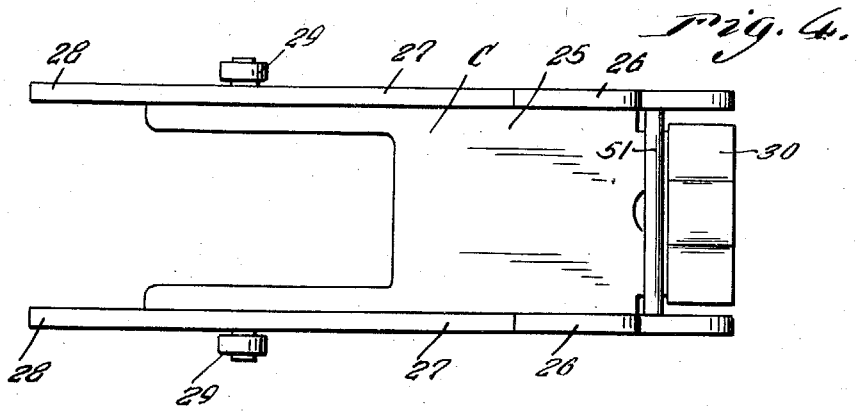
Fig. 4 is a top plan view of the carriage.

Referring to the drawings in detail it will be seen that the letter F denotes generally a frame having a reciprocable slidable connection with a carriage C.

The frame F includes a pair of spaced parallel co-extensive stringers 5 connected by an intermediately disposed transverse platform 6 which extends out beyond the sides of the stringers. The numeral 7 denotes a cross member disposed under the rear portions of the stringers 5 and held in place by offset bracket arms 8 and 9, the former projecting forwardly and the latter rearwardly. Letters K denote a pair of steering knuckles swingable on the ends of the cross member 7 as at 10. Each steering knuckle comprises a pair of arms 11 and 12 angularly disposed. The arms 12 extend inwardly toward each other while the arms 11 extend forwardly. A flange 14 depends from the arm 11. Wheels 15′ are rotatably mounted on these flanges by means of axles or spindles 15′ which are fixed in openings 16 provided in the flanges 14. Rods 17 rise from the ends of the arms 12. A tie rod 18 connects the ends of the arms 11 to cause the wheels 15 to steer in unison. On the front end of the stringers 5 there is mounted an upwardly extending bracket 20 having at its upper end a rearwardly disposed extension 21 under which is rockable a segment 22 having feet engaging elements 23 rising therefrom. A cable 24 has its intermediate portion trained about the segment and the ends thereof secured to the upper ends of the rods 17. From the description as it has thus far progressed it will be readily seen that by properly manipulating the segment 22 with the feet engaging the elements 23 the rear wheels may be steered.

Figures 2, 6:
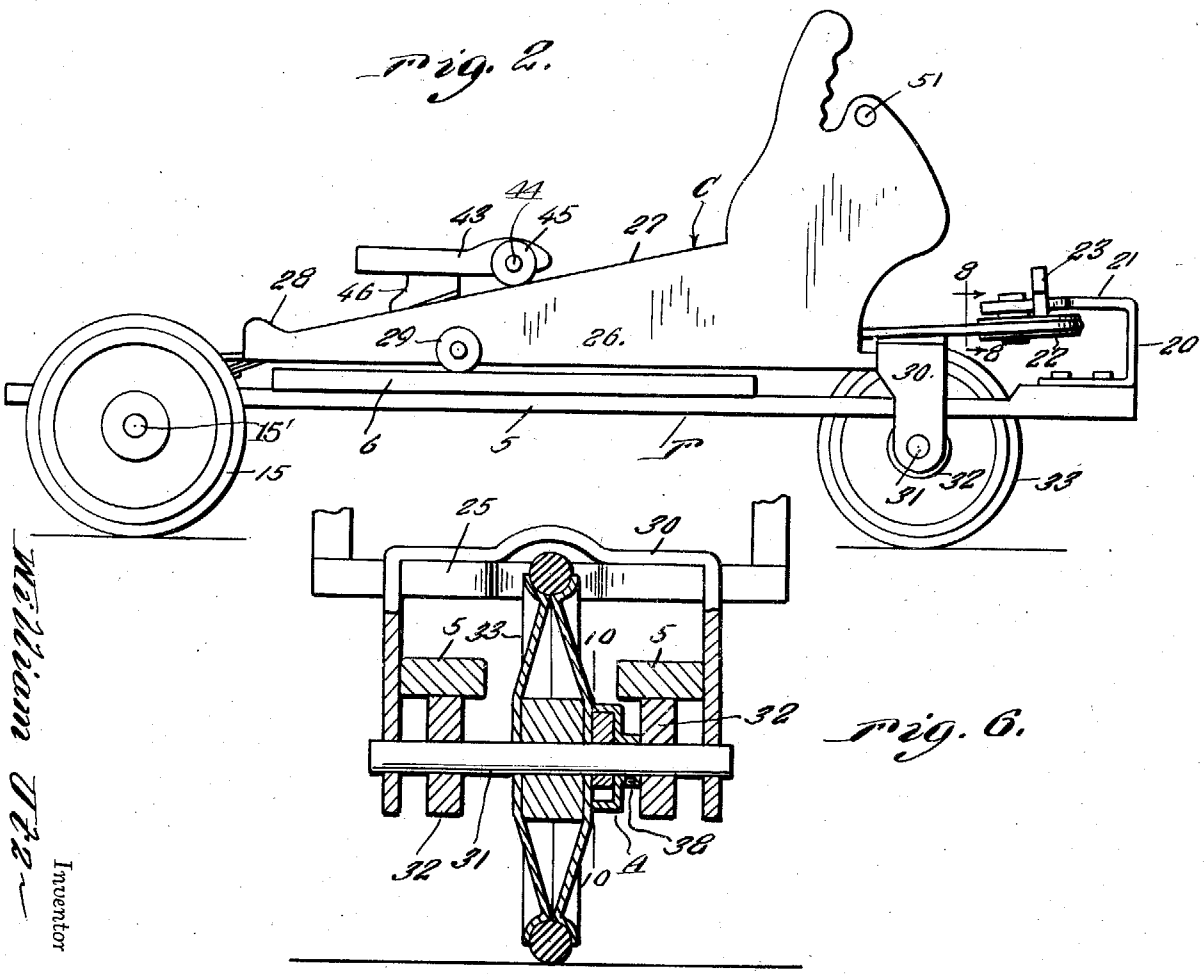
Fig. 2 is a side elevation thereof.
Fig. 6 is a vertical transverse section taken substantially on the line 6—6 of Figure 3.

The carriage C includes a bottom 25 having sides 26 rising therefrom and it will be noted that these sides are provided with upper edges 27 which incline downwardly and rearwardly from forward points of the sides and at their bottom ends merge into relatively short upwardly and rearwardly inclined extensions 28. Wheels or rollers 29 are mounted on the bottom intermediate portions of the sides to ride on the platform 6. An inverted yoke bracket 30 is mounted on the forward end of the bottom 25 and has a shaft 31 extending between the ends thereof. Rollers 32 are rotatable with the shaft and the stringers 5 ride thereon as shown to advantage in Figure 6. A wheel 33 is freely rotatable on the shaft 31 at the center thereof and has a free running clutch operatively associated therewith. The structure of the clutch may best be seen in Figure 10 and includes the disk 35 fixed as at 36 to the hub of the wheel 33 and being rotatable about the shaft 31. A drum 37 is fixed to the shaft 31 by a set screw 38 or the like and encompasses the disk. The disk 35 is provided with a plurality of peripheral notches 39 in which are located balls 40 spring pressed as at 41 toward the interior of the rim of the drum 37. It will readily be seen that the wheel may rotate freely forwardly but is prevented from rotating rearwardly because of the wedging action of the balls 40.

Numeral 43 denotes a seat and at the forward portion thereof there extends laterally therefrom a pair of fixed axles 44 on which are journalled rollers 45 to ride on the edges 27. A bracket 46 depends from the seat and is fixed to a rod 47 the lower end of which is rockable as at 48 on a cross rod 49 fixed across the rear portions of the stringers forwardly of the steering mechanism as indicated at 50.

When a person occupies the seat 43 with his feet resting on the elements 23 and his hand on the bar 51 which extends between the forward and upper end portions of the sides 26 it will be seen that he may reciprocate the carriage with respect to the frame and in so doing will impart forward movement to the vehicle because of the free running clutch A and at the same time may readily steer the vehicle.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

More specifically the operation is as follows: When the occupant of the vehicle pulls on the handle 51 and simultaneously pushes with his feet on the elements 23, the carriage C will be moved back on the frame F and the seat 43 will ride up on the incline of the carriage. During this movement the stringers 5 will rotate the rollers 32 and the shaft 31 by reason of the frictional engagement between the stringers and the rollers. The wheel 33, and consequently the vehicle, will be rotated ahead by this movement because of the clutching of the free wheeling connection between it and the shaft. At the end of the above stroke, the occupant pushes on the handle 51 and exerts pressure against the seat 43 so that the stringers 5 of the frame move back with respect to the rollers 32 of the carriage. During this movement the free wheeling clutch is not engaged so that the wheel 33 may continue its forward movement. The inertia of the vehicle will keep it rolling during this latter movement.

What I claim is:

1. A vehicle including, in combination, a frame, a carriage slidably mounted on the frame, wheel means supporting the frame at one end of the vehicle, wheel means supporting the carriage at the other end of the vehicle, means on the carriage and means on the frame whereby an operator positioned on the frame means and manipulating the carriage means causes the reciprocation of the frame and carriage with respect to each other, and means operatively connecting the wheel means of said carriage to said frame so that said reciprocation will directly rotate the last named wheel means thereby imparting movement to the vehicle.

2. A vehicle including, in combination, a frame, a carriage slidably mounted on the frame, wheel means supporting the frame at one end of the vehicle, wheel means supporting the carriage at the other end of the vehicle, said carriage having inclined portions, a seat having rollers bearing on the inclined portions, a rod fixed to the seat and swingably connected with the frame, and means operatively connecting the wheel means of said carriage to said frame.

3. A vehicle including, in combination, a frame, a carriage slidably mounted on the frame, wheel means supporting the frame at one end of the vehicle, wheel means supporting the carriage at the other end of the vehicle, said carriage having inclined portions, a seat having rollers bearing on the inclined portions, a rod fixed to the seat and swingably connected with the frame, said second mentioned wheel means comprising an inverted yoke fixed to the forward portion of the carriage and having its sides straddling the forward portion of the frame, a fixed axle across the ends of the yoke, a wheel on said axle to rotate thereon, and means operatively connecting said wheel with said frame.

4. In a vehicle, a main section, a second section slidably mounted relative to said main section, wheel means supporting the main section at one end of the vehicle, wheel means supporting the second section at the other end of the vehicle, one of said sections extending substantially the distance between said wheel means, seat means on one of said sections and handle means rigidly attached to the other of said sections whereby an operator positioned on the seat means by exerting force on said handle means causes reciprocation of said sections with respect to each other, and means operatively connecting the wheel means of one of said sections to the other of said sections whereby said reciprocation will directly rotate said wheel means thereby imparting movement to the vehicle.

5. In a vehicle, a main section, a second section slidably mounted relative to said main section, wheel means located at each end of the vehicle for supporting said sections, one of said sections extending substantially the distance between said wheel means at all times, seat means on one of said sections for carrying an operator, handle means rigidly attached to the other of said sections whereby an operator positioned on the seat means, by exerting force on said handle means, causes reciprocation of said sections, and means operatively connecting the wheel means of one of said sections to the other of said sections so that said reciprocation of said sections will directly rotate the wheel means thereby imparting movement to the vehicle.

6. A vehicle including, in combination, a frame, a carriage slidably mounted with respect to said frame, wheel means supporting the frame at one end of the vehicle, wheel means supporting the carriage at the other end of the vehicle, a seat means on said frame, and a handle means rigidly fastened to said carriage whereby an operator positioned on said seat means and exerting force on said handle means causes reciprocation of said frame and carriage with respect to each other, and means operatively connecting the wheel means of said carriage to said frame so that said reciprocation will directly rotate the last named wheel means thereby imparting movement to the vehicle.

7. A vehicle including, in combination, a frame, a carriage slidably mounted with respect to said frame and adapted to remain in substantially parallel relationship with said frame at all times, wheel means supporting the frame at one end of the vehicle, wheel means supporting the carriage at the other end of the vehicle, a seat means on said frame, and a handle means on said carriage whereby an operator positioned on said seat means and exerting force on said handle means causes reciprocation of said frame and carriage with respect to each other, and means operatively connecting the wheel means of said carriage to said frame so that said reciprocation will directly rotate the last named wheel means thereby imparting movement to the vehicle.

8. A vehicle including, in combination, a frame, a carriage slidably mounted with respect to said frame and adapted to remain in substantially parallel relationship with said frame at all times, wheel means supporting the frame at one end of the vehicle, wheel means supporting the carriage at the other end of the vehicle, a seat means on said frame, and a handle means rigidly fastened to said carriage whereby an operator positioned on said seat means and exerting force on said handle means causes reciprocation of said frame and carriage with respect to each other, and means operatively connecting the wheel means of said carriage to said frame so that said reciprocation will directly rotate the last named wheel means thereby imparting movement to the vehicle.

9. A vehicle including, in combination, a one piece frame, a one piece carriage slidably mounted with respect to said frame and adapted to remain in substantially parallel relationship with said frame at all times, wheel means supporting the frame at one end of the vehicle, wheel means supporting the carriage at the other end of the vehicle, a seat means on said frame, and a handle means rigidly fastened to said carriage whereby an operator positioned on said seat means and exerting force on said handle means causes reciprocation of said frame and carriage with respect to each other, and means operatively connecting the wheel means of said carriage to said frame so that said reciprocation will directly rotate the last named wheel means thereby imparting movement to the vehicle.

WILLIAM UTZ.